United States Patent
Zaleckas

[11] 3,902,036
[45] Aug. 26, 1975

[54] CONTROL SYSTEM USING MULTIPLEXED LASER BEAMS

[75] Inventor: Vincent Joseph Zaleckas, Union Twp., Union County, N.J.

[73] Assignee: Western Electric Company, Incorporated, New York, N.Y.

[22] Filed: May 2, 1974

[21] Appl. No.: 466,313

[52] U.S. Cl.... 219/121 L; 331/94.5 R; 219/121 LM
[51] Int. Cl.²........................................ B23K 27/00
[58] Field of Search... 219/121 L, 121 LM, 121 EB, 219/121 EM; 331/94.5 K, DIG. 1, 94.5 Q

[56] References Cited
UNITED STATES PATENTS

| | | | |
|---|---|---|---|
| 3,475,760 | 10/1969 | Carlson | 219/121 LM X |
| 3,659,613 | 5/1972 | Bredemeier | 331/94.5 X |
| 3,689,159 | 9/1972 | Taniguchi et al. | 219/121 L X |
| 3,806,829 | 4/1974 | Duston et al. | 331/94.5 |

*Primary Examiner*—J. V. Truhe
*Assistant Examiner*—G. R. Peterson
*Attorney, Agent, or Firm*—E. W. Pfeifle; B. W. Sheffield

[57] ABSTRACT

One or more reference beams from a low-power HeNe laser are multiplexed onto the optical path of a pulsed or Q-switched high-power YAG laser and thereby suffer the same deflection in galvanometer-type deflection apparatus used to deflect the main beam as does the main beam. The reference beams are next split off, prior to the impingement of the YAG beam on the workpiece to be machined, and passed through reference grids. After the beams pass through the reference grids, photodiodes generate signals which can be used to determine precisely where the YAG beam will impinge upon the workpiece when next energized.

19 Claims, 8 Drawing Figures

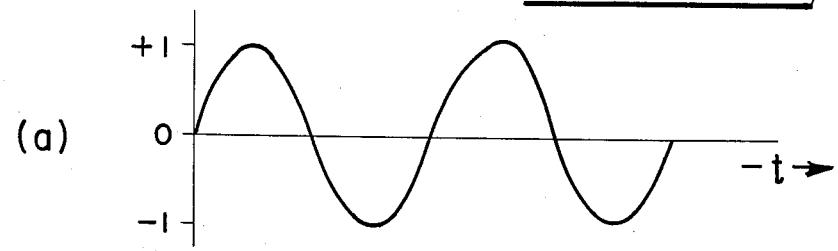
(a)
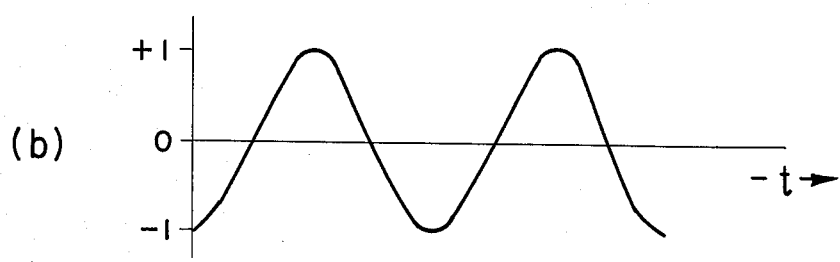
(b)
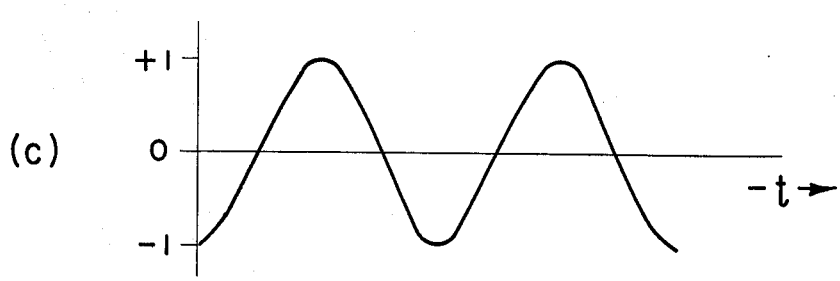
(c)
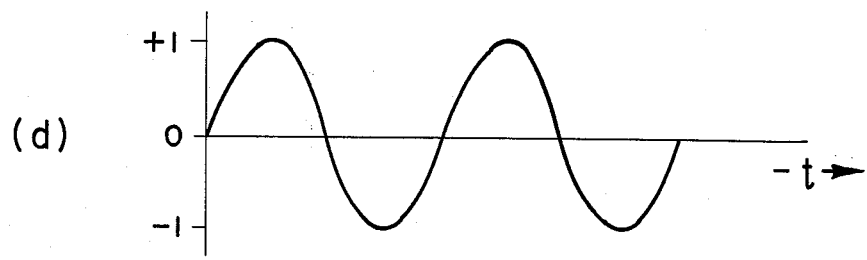
(d)
FIG. 5
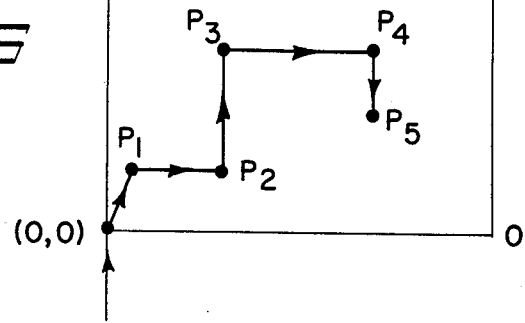
FIG. 6

FIG. 8
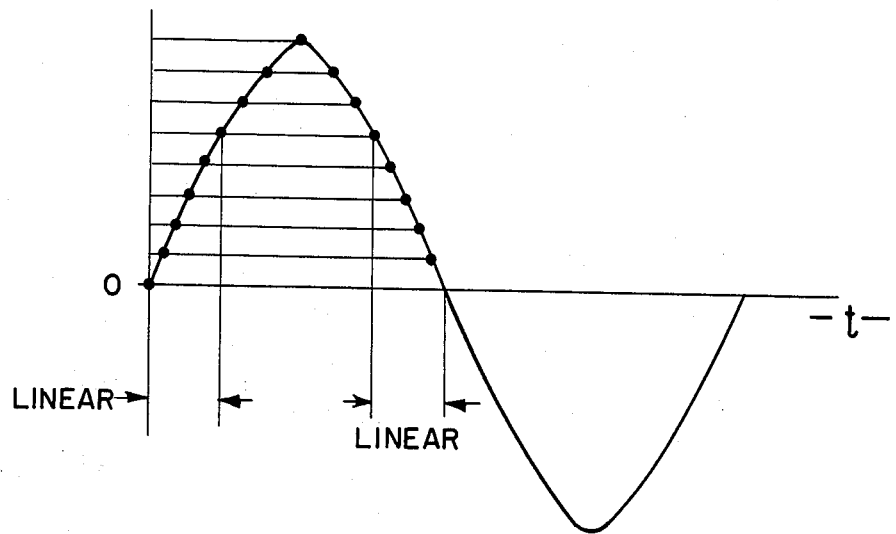
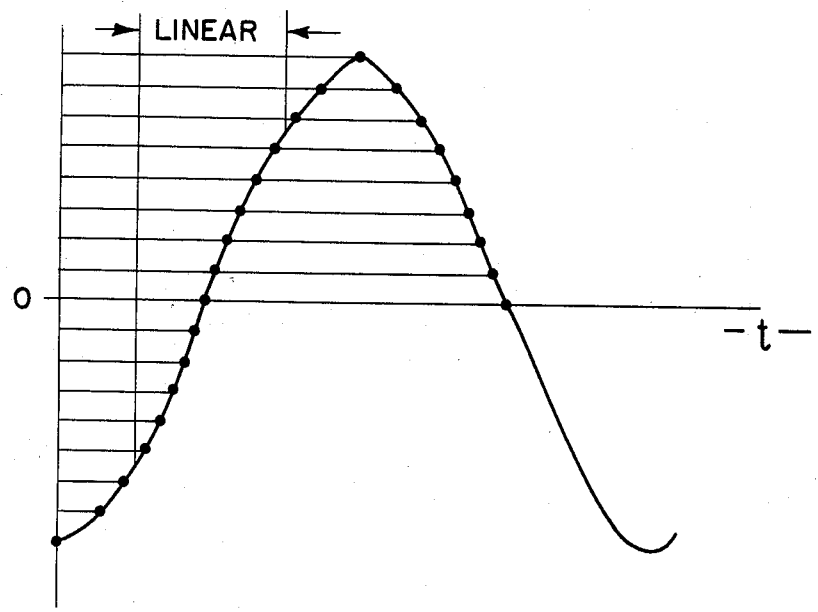

CONTROL SYSTEM USING MULTIPLEXED LASER BEAMS

BACKGROUND OF THE INVENTION

1. Field of the Invention

Broadly speaking, this invention relates to methods and apparatus for accurately controlling the position of a beam of radiant energy. More particularly, in a preferred embodiment, this invention relates to methods and apparatus for accurately controlling the point of impingement of a pulsed or Q-switched laser beam upon a workpiece to be machined by the beam.

2. Discussion of the Prior Art

The use of a laser beam to machine various workpieces has been widely reported in the literature. For example, it has been reported that lasers have been successfully employed to trim thin-film resistors and capacitors; to separate ceramic substances and silicon wafers; and to manufacture integrated circuit photomasks, either by selectively exposing photoresist-covered substrates, which substrates are subsequently developed, bleached and etched, or by selectively removing metal from a metallized glass plate.

Applications such as those listed above, require a relatively powerful laser for successful operation. Although continuous wave (CW) lasers have been employed for this purpose, at these power levels CW lasers are expensive and bulky and it is, therefore, preferable to employ a pulsed or Q-switched laser to generate the high-power densities required for successful machining of such workpieces.

In any machining operation it is, of course, essential that the position of the laser beam relative to the workpiece be accurately known at all times. This is especially true in applications such as the manufacture of masks for large scale integrated circuits (LSI) which, due to the extremely tight tolerances on the dimensions of the mask's features, requires extremely accurate positioning of the laser beam.

Because a pulsed or Q-switched laser beam is only intermittently energized, it is impossible to use the beam itself as a tool to continuously monitor the position of the beam relative to the workpiece. Put another way, it is only after a pulsed or a Q-switched laser has been energized that one can accurately determine where the beam will impinge upon the workpiece. Thus, if the beam is improperly positioned, for whatever reason, it is already too late to take any corrective action and the workpiece will be improperly machined and/or ruined. Even if a CW laser having a constant output were used, the high energy content of the beam would nevertheless make it difficult to use the beam as its own position monitor. For example, because of the aforesaid high-beam energy, it is not feasible to employ digital light deflectors to deflect the beam. Thus, conventional analog deflection systems of the galvanometer-mirror type must be employed.

As is well known, because of mechanical inertia, such analog systems are inherently subject to beam overshoot resulting in oscillation or "hunting" about the desired beam position. It, thus, becomes even more important to accurately determine the position of the beam relative to the workpiece, prior to energization of the high-power laser.

The problem, restated, is to provide methods and apparatus for continuously controlling the position of a relatively high-power, pulsed or Q-switched laser beam to be used for the machining of workpieces.

SUMMARY OF THE INVENTION

These and other problems have been solved by the instant invention which comprises a method of the type which includes the step of positioning deflection apparatus to deflect the optical path of an intermittently energized first beam of radiant energy so that the beam will impinge upon a selected region of a workpiece. More particularly, the invention resides in the improvement which comprises superimposing a second, continuous beam of radiant energy upon the optical path so that the second beam experiences the same deflection in the deflection apparatus that the first beam will experience when next energized. The invention proceeds by next diverting the second beam from the optical path, subsequent to its deflection in the deflection apparatus, and then, measuring the degree of deflection effected upon the second beam, relative to some arbitrary reference point, thereby predicting the degree of deflection to be effected upon the first beam and determining, prior to the energization thereof, whether or not the first beam will impinge upon the selected region.

To practice the above method, for example, in apparatus of the type wherein an intermittently energized first beam of radiant energy is deflected by deflection apparatus to impinge upon a selected location on a workpiece, the invention more particularly comprises means for predicting where the beam will impinge upon the workpiece, when the beam is next energized, the predicting means comprising a continuously energized second beam of radiant energy, and means, positioned in the optical paths of the first and second beams, upstream of the deflection apparatus, for multiplexing the second beam onto the optical path of the first beam. The predicting means also includes a beam splitter, positioned downstream of the deflection apparatus, for separating the optical paths of the first and second beams, the optical path of the first beam thereafter impinging upon the workpiece, and means, positioned in the optical path of the second beam, for determining the degree of deflection experienced by the second beam, relative to some arbitrary reference point, thereby predicting the degree of deflection that the first beam will undergo when next energized and thus determining, prior to the energization thereof, whether or not the first beam will impinge upon said selected location.

DESCRIPTION OF THE DRAWINGS

FIGS. 5(a) and 5(d) depict typical waveforms which may be generated in the apparatus shown in FIG. 1;

FIG. 6 illustrates the mode of operation of the invention shown in FIGS. 1–4;

FIG. 8 depicts typical waveforms found in an alternate embodiment of the invention.

DETAILED DESCRIPTION OF THE INVENTION

Figure 1:
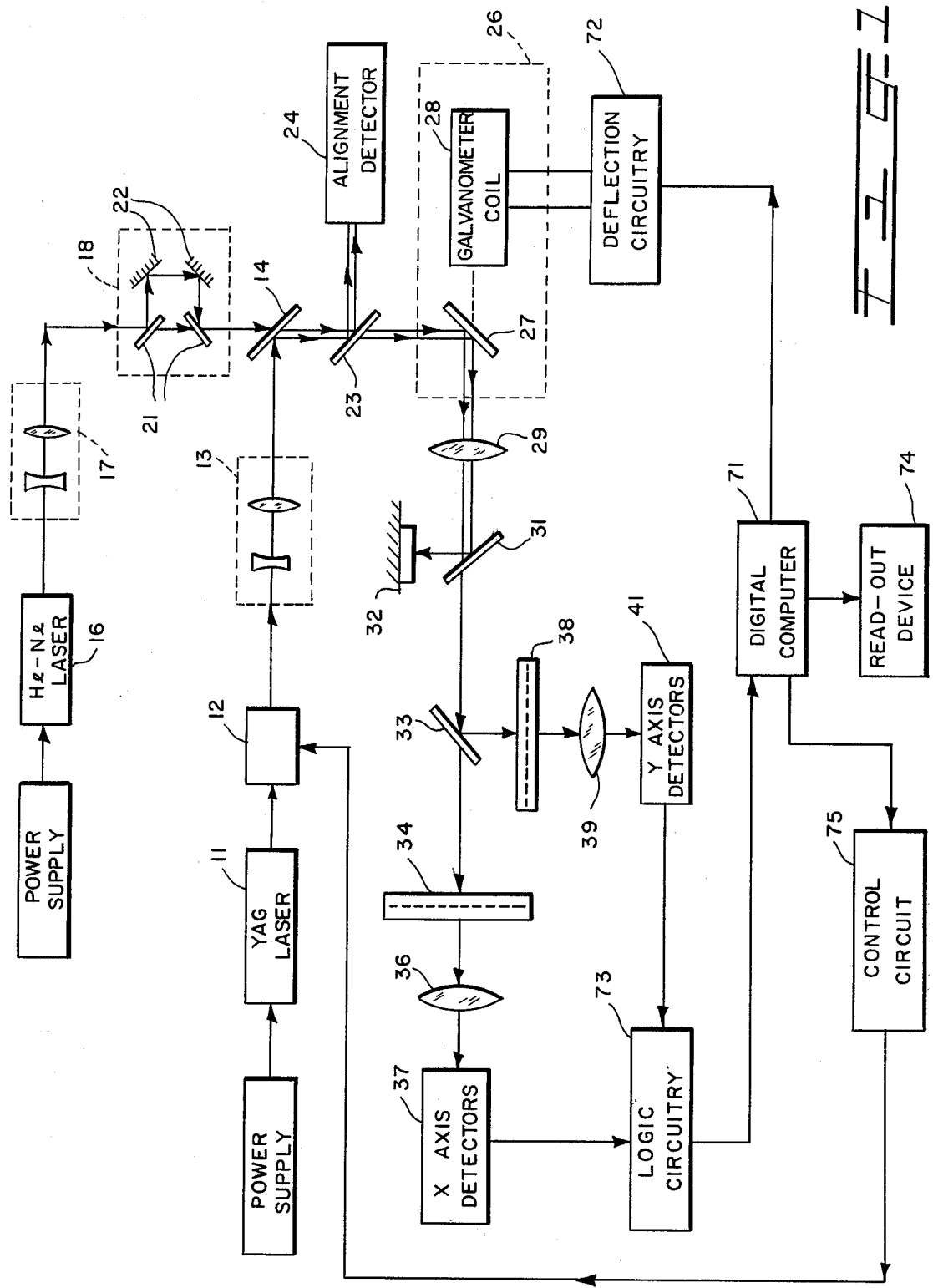
FIG. 1 is a schematic drawing of a first illustrative embodiment of the invention.

FIG. 1 depicts a first illustrative embodiment of the invention. As shown therein, a beam of radiant energy from a high-power, Q-switched laser 11, for example, a yttrium aluminum garnet (YAG) laser operating at a wavelength of $1.06\mu$ and a continuous power of 10 watts, is passed through an optical switch 12, for example, an acousto-optic modulator, and a conventional beam expander 13, for example, a 10X expander, to expand the beam from its initial diameter of 2 mm to approximately 20 mm, thence to impinge upon a beam combiner 14.

A second beam of radiant energy from a second laser 16, for example, a continuous wave (CW) helium-neon (HeNe) laser operating at a wavelength of $0.63\mu$ and a power level of 15 mW, is passed through a beam expander 17, similar in construction to beam expander 13, and a dual-beam generator 18 comprising, for example, a pair of beam splitters 21—21 and a pair of mirrors 22—22.

As will be more fully explained below, dual beam generator 18 divides the beam from laser 16 into two beams of substantially equal power. The two beams are then combined or multiplexed with the high-power beam from laser 11 in beam combiner 14 which is designed to have approximately 99 percent reflectance at a wavelength of $1.06\mu$ (i.e., the YAG laser) and approximately 50 percent transmission at a wavelength of $0.63\mu$ (i.e., the HeNe laser). Actually, since the high-power beam is only intermittently energized, it is, perhaps, more correct to say that it is the optical paths of the two lower-power beams which are combined with the optical path of the high-power beam; however, the two modes of expression are used interchangeably below.

The high-power beam and the two low-power beams which are multiplexed on it are next passed through a beam splitter 23 which allows most of the energy falling thereon to pass through, but which reflects a small percentage of all three beams into an alignment detector 24. As its name suggests, alignment detector 24 permits an operator to verify that the two HeNe beams are aligned along the same optical path that the YAG beam will follow when next energized. Next, the three beams passing through beam splitter 23 are subjected to deflection along two orthogonal axes by means of a deflection apparatus 25, for example, a plane mirror 27 mounted on a rotatable galvanometer coil 28. In actual practice, two mirrors 27 and two galvanometer coils 28 are used to provide successive deflections along both the x and y axes; however, to avoid complicating the drawing only one mirror and one galvanometer have been shown. Coil 28 is, of course, connected to some suitable source of current (not shown) within deflection circuitry 72 which rotates mirror 27 through the desired angle to deflect the high-power laser beam across the workpiece.

The main beam and the two reference beams are then focused by a scanning lens 29 and separated out again by a beam splitter 31 which has essentially the same characteristics as beam combiner 14, that is to say, 99 percent reflectance for the high-power YAG laser beam and 50 percent transmission for the two low-power HeNe laser beams.

When the YAG laser is energized, the high-power laser beam impinges upon the machining plane 32 where the workpiece to be machined is positioned. Advantageously, lens 29 is mounted for movement along the optical axis so that the beam from laser 11 may be focused onto the surface of the workpiece to be machined.

The two HeNe beams then pass through a conventional beam splitter 33 which generates two pairs of beams of equal intensity, each pair having one beam 90° spatially out-of-phase with respect to the other. One pair of beams passes through a grid 34 and a collection lens 36 to impinge upon an x-axis detector 37, while the other pair of beams passes through a grid 38, a collection lens 39 and a y-axis detector 41.

Grids 34 and 38 each comprise a plurality of spaced-apart opaque lines or rulings on a transparent field, the lines on one grid being orthogonally oriented with respect to the lines on the other grid. In one experimental embodiment of the invention actually built and tested, both grids comprised a 4 inch × 4 inch KODAK photographic plate having a plurality of 0.5 mil opaque regions thereon, spaced apart 1 mil on center, normal to the direction of scan. That is to say, the x or horizontal axis grating comprised a plurality of vertical rulings, while the y or vertical axis grating comprised a plurality of horizontal rulings. As will be explained below, the reason why 0.5 mil spacing and 0.5 mil line width was selected in this experimental embodiment, was the second lens 29 produced a focused beam 1.0 mil in diameter.

Figure 2:
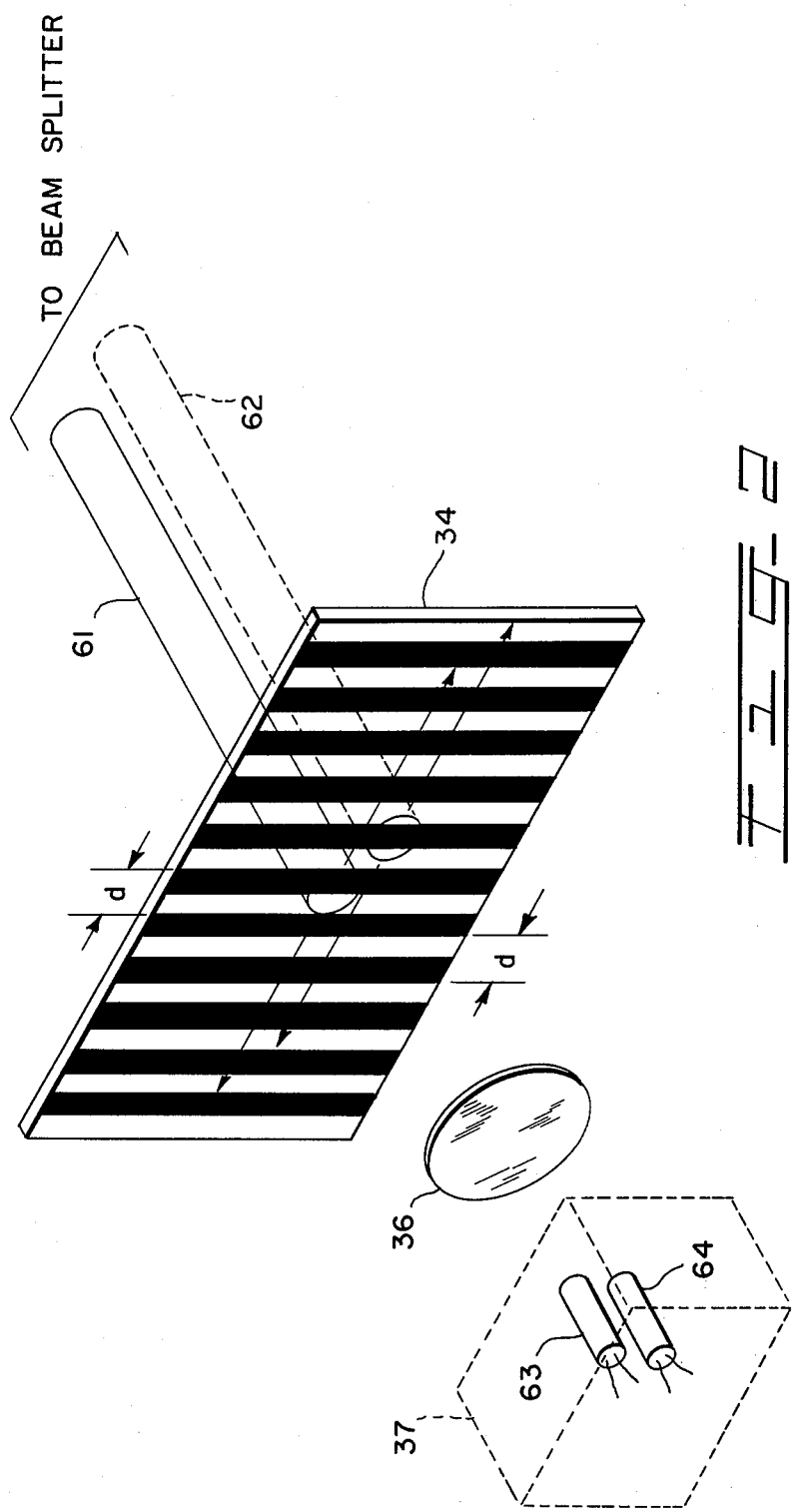
FIG. 2 is a schematic drawing of a portion of the apparatus shown in FIG. 1 and depicts the reference grid in more detail.

FIG. 2 depicts in greater detail the apparatus employed to determine the beam position along the x-axis. As shown, this apparatus comprises grid 34, lens 36 and x-axis detector 37. The apparatus employed to determine the beam position along the y-axis, that is to say, grid 38, lens 39 and detector 41, is identical to the apparatus used for x-axis detection and is not illustrated in FIG. 2. It should, of course, be remembered that physically, the y-axis apparatus is rotated through an angle of 90° with respect to the x-axis apparatus.

The periodicity of grid 34 is selected such that the physical distance between adjacent opaque regions thereon is equal to the diameter of the multiplexed reference beams 61 and 62, both of which are the same size. As previously, discussed, if the beam diameter is 1 mil, the width of each opaque ruling will be ½ mil and the periodicity (i.e., the spacing between corresponding points on successive rulings) will be 1 mil.

It will be recalled that dual-beam generator 18 takes the output from the laser 16 and generates two beams. The two beams, 61 and 62 are so oriented as to be 90° spatially out-of-phase with respect to grid 34 (and also grid 38). Thus, as shown in FIG. 2, if we assume that both of the multiplexed beams are moving from left to right, when the left-hand side of beam 61 traverses the transition between an opaque and a transparent region on the grid, beam 62, being 90° spatially out-of-phase, will be exactly centered over an adjacent opaque region. As will be more fully explained below, this out-of-phase condition indicates to the electronic circuitry shown in FIG. 1 whether the beams are moving to the left or to the right on the grid. More generally, the spatial separation between the two reference beams is $(90 + 2\pi n/360)°$, where n is any positive integer, but 90° spacing is perfectly adequate if the diameter of the multiplexed beams is adequately controlled.

Figure 3:
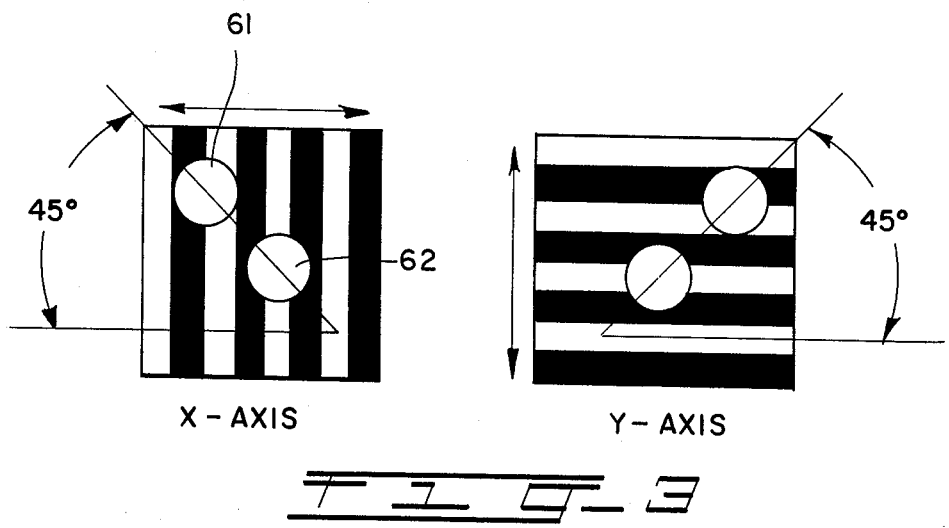
FIG. 3 is a schematic drawing showing the impingement of two reference laser beams on two orthogonally oriented reference grids.

To achieve identical orientation on both the $x$ and $y$ axis grids, the optics within beam generator 18 are further adjusted so that beam 62 is not only laterally displaced by the equivalent of 90°, but is also displaced downwardly along a 45° line passing through beam 61. This 45° angle represents, of course, one-half of the 90° angle priorly established between the two reference grids and, thus, preserves the symmetry of the optical system. This symmetry will be more clearly seen in FIG. 3 which shows the impingement of both reference beams on portions of both the $x$ and $y$-axis grids.

Figure 4:
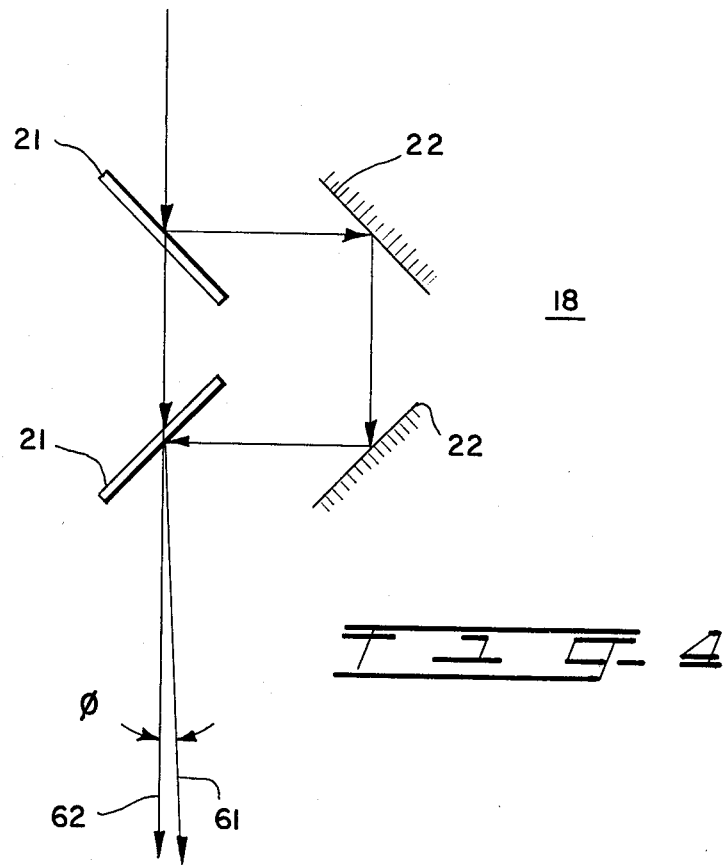
FIG. 4 is a schematic drawing of a dual-beam generator for use in the apparatus shown in FIG. 1.

As shown in FIG. 4, as beam 61 exits from beam generator 18, it is further displaced from beam 62 by an angle $\theta$°. The reason for providing this shift between the two beams is that, in general, it is highly desirable that the high-power beam from YAG laser 11 always strike the workpiece plane 32 normally. If lens 29 were of a conventional design, the angle that the high-powered beam would make to the workpiece plane would be a function of the degree of deflection that the beam experienced as it was reflected off each galvanometer mirror. This angle would, of course, be greatest for the more extreme positions of deflection. To overcome this undesirable feature a telecentric lens, for example, the telecentric lens disclosed in U.S. Pat. No. 3,773,404, which issued on Nov. 20, 1973, in the name of D. T. Moore, may be substituted for the conventional focusing lens. As disclosed in the above-referenced Moore patent, a telecentric lens possesses the unique property that, regardless of the angle that the incoming beam makes to the lens, the focused beam at the opposite side of the lens is always normal to the focal plane of the lens. Thus, with the use of a telecentric lens, if the high-powered laser beam were employed, for example, to drill through-holes in a ceramic substrate, the through-holes would always be normal to the surface of the ceramic substrate, a highly desirable feature. However, with respect to the multiplexed, low-power reference beams, if the beams were parallel as they exited from beam generator 18, they would both make the same entrance angle to the telecentric lens and would thus, be imaged by the lens onto overlapping regions on the two grids. This would, of course, defeat the very purpose of the invention. Accordingly, beam-generator 18 is designed so that the two multiplexed beams follow slightly divergent paths as they exit from the generator so that after passage through the telecentric lens, the two beams will maintain their spatially separate paths.

Returning now to FIG. 2, the point of impingement of beams 61 and 62 on grid 34 is imaged by lens 36 upon $x$-axis detector 37 which includes, inter alia, a pair of photodiodes 63 and 64. Because photodiodes 63 and 64 are vertically displaced from each other (along a 45° line), and are thus separated in the vertical plane, it is relatively easy to physically arrange the photoconductors so that each photodetector "sees" only one of the two reference beams. Further, collection lens 36 images the surface of a fixed mirror in the deflection galvanometer system rather than the alignment grid. Thus, lens 36 concentrates stationary and separated reference beams onto the photodiodes, and only one photodiode is needed for each beam. Photodiode 64 will, thus, produce a periodic, essentially sinusoidal, output signal corresponding to the traversal of beam 62 only across the rulings of grid 34. In like fashion, photodiode 63 will generate a periodic output signal corresponding to the light variations produced by beam 61 alone.

The system depicted in FIG. 1 is a random access system, that is to say, the galvonometer mirrors can randomly deflect the high-power beam, in accordance with command signals received from a computer 71, to machine any desired region on the workpiece. Such a system differs radically from a sequential access system wherein the beam is swept across the workpiece in a raster-like fashion.

In a system of the type disclosed herein, the address of the current region to be machined is compared in a computer 71 with the address of the previously machined region. The difference in these addresses is forwarded to a deflection circuit 72 which makes the appropriate digital-to-analog conversion and then generates the necessary signals to deflect the $x$ and $y$ galvanometer mirrors to move the beam to the new location on the workpiece. In accordance with the instant invention, after the new beam position has been verified by use of the reference beams, the high-power laser is fired to machine the workpiece, and the process reiterated for the remaining regions on the workpiece which are to be machined.

FIG. 6 illustrates the above-described process. The lower left-hand corner of the workpiece is taken as an arbitrary reference point with coordinates (0,0). For the sake of illustration, assume that there are 10,000 addressable locations along both the $x$ and $y$ axes. There will, thus, be a total of $10^8$, or 100,000,000 addressable points in the field of the workpiece. Assume further that $P_1$ is the first region of the workpiece to be machined and that it has an address, say, of (256, 1024). The unitary increment in $x$ necessary to bring the beam from the origin to the $x$ coordinate for point $P_1$ is $(256 - 0) = 256$, and the corresponding unitary increment in y from the origin is $(1024 - 0) = 1024$. This information is passed by computer 71 to deflection circuit 72 which then positions the beam so that it will, in theory, impinge upon point $P_1$ on the workpiece. Next, the actual position that the beam will assume when energized is checked by means of the two reference beams and any corrections that are necessary are made. Then, the laser is fired and the corrected beam position stored in the computer so that the appropriate deflection signals can subsequently be generated to move the high-power beam from $P_1$ to $P_2$, the next area on the workpiece to be machined.

FIGS. 5($a$) through 5($d$) depict typical waveforms which are generated by photodiodes 63 and 64 in x-axis detector 37. Essentially identical waveforms are generated by the corresponding photodiodes in the $y$-axis detector 41, but are not shown. FIG. 5($a$) represents the output of photodiode 63 as beam 61 sweeps from the origin towards the $x$ coordinate for point $P_1$, that is, 256 in our example. Referring momentarily to FIG. 2, this corresponds to the situation where beam 61 sweeps from the right-hand edge of grid 34 towards the position shown in the drawing. FIG. 5($b$) similarly represents the corresponding output of photodiode 64 for beam 62.

The distance that either of the two reference beams has traversed from the origin, and hence, the distance that the optical path of the main beam has traversed from its origin, may be found by simply counting the number of cycles in either of the two waveforms, using a conventional counter. In the experimental embodiment actually built and tested, counting was accomplished by converting the detected analog waveform into digital pulses occurring at the zero crossings of each waveform. In the experimental embodiment, one complete cycle of the analog waveform corresponded to a beam movement of 1 mil and, hence, each zero crossing represented a displacement of 0.5 mil. The direction in which the reference beams, and hence, the main beam, are traveling can be found by comparing the phase of the two output waves 5(a) and 5(b). Thus, in FIG. 2, with the two reference beams traveling to the left, that is, in the positive direction, beam 61 will lead beam 62. Thus, waveform 5(a) will lead waveform 5(b), which fact may readily be ascertained in a simple phase detector circuit. FIGS. 5(c) and 5(d) show the opposite condition, that is, the situation when the two reference beams are traveling to the right or negative direction. Here, beam 62 leads beam 61, and waveform 5(d) correspondingly leads waveform 5(c).

Operation of the y-axis detector is entirely analogous to operation of the x-axis detector, and will not be discussed. However, it should be remembered that at least 50 percent of the time, the x-axis reference beam will be moving in one direction, while the y-axis beam is simultaneously moving in the opposite direction.

Figure 7:
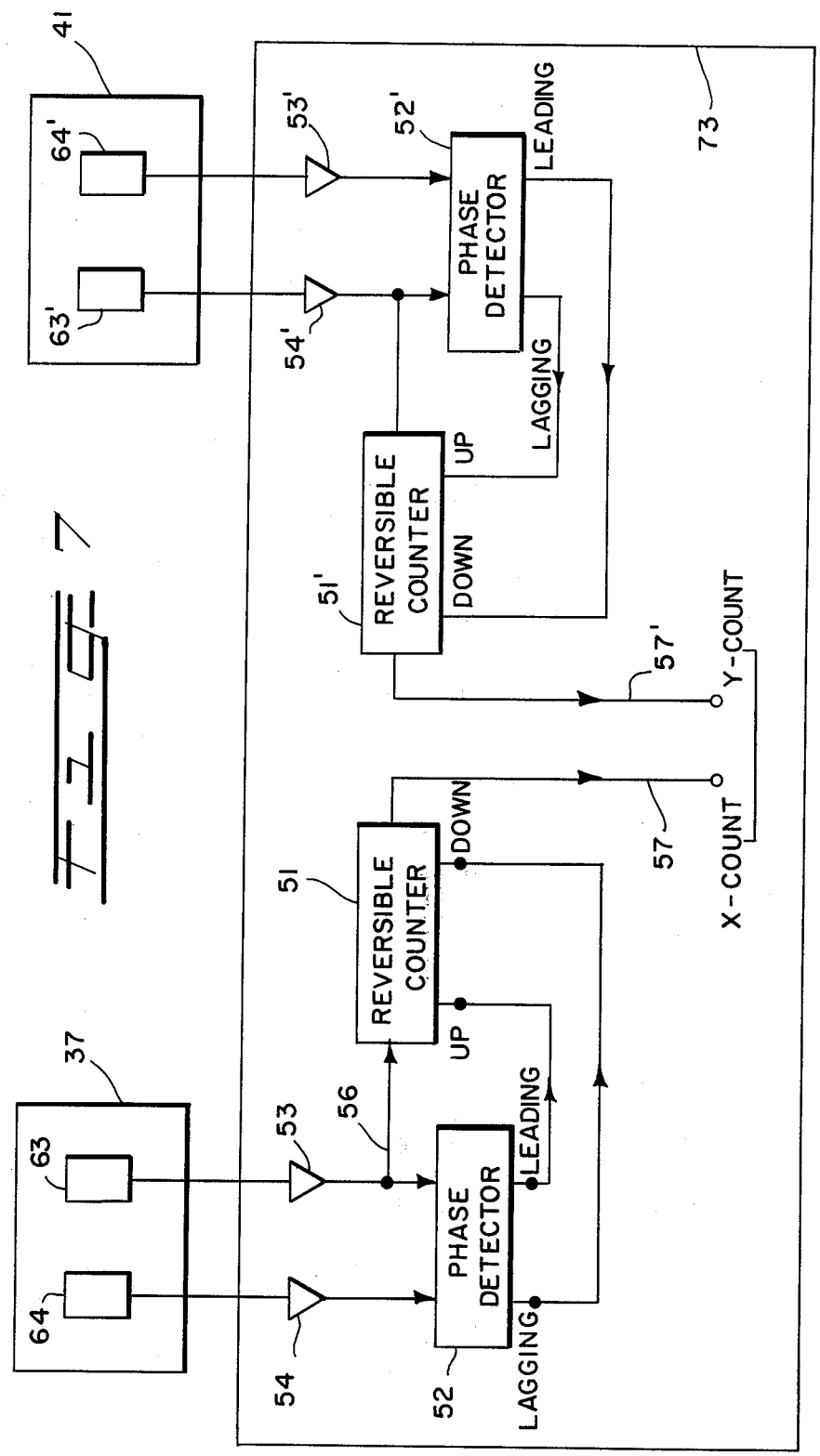
FIG. 7 is a block diagram drawing depicting the logic circuit shown in FIG. 1 in greater detail.

FIG. 7 depicts logic circuit 73 in greater detail. As shown, logic circuit 73 includes an up-down counter 51 and a phase detector 52. The output of photodiodes 63 and 64 in detector 37 is amplified by amplifiers 53 and 54 and then fed to the input of phase detector 52. The amplified output of photodiode 63 is also applied, via a lead 56, to the input of a reversible counter 51 to drive the same. Phase detector 52 has two outputs, one indicating the presence of a leading phase condition between the signals at its inputs, the other indicating a lagging phase condition between the signals at its inputs. The leading output is connected to the "up" input of counter 51, while the lagging output is correspondingly connected to the "down" input of counter 51. When counting has stopped, the count stored in counter 51 is forwarded, via a lead 57, to computer 71, as shown in FIG. 1. In an analogous manner, the output of photodiodes 63' and 64' in y-axis detector 41 are amplified and counted to provide the corresponding y count for computer 71.

The operation of the circuit shown in FIG. 7 will now be discussed. A previous example had discussed deflection of the beam along the x-axis from the origin to address location 256. Assume that, due to the mechanical inertia in the deflection system, the galvanometer overshoots the desired position so that the reference beam ends up at address location 280. Photodiodes 63 will detect 280 traversals of the opaque rulings on grid 34, which fact will be recorded in counter 51. Counter 51 will count up, rather than down, because phase detector 52, responsive to the fact that the phase of the signal from photodiode 63 leads the phase of the signal from photodiode 64, will generate a signal on the "leading" output lead of the phase detector.

Assume now that the undamped spring tension within the galvanometer deflection system causes the mirror to swing back, so that the reference beam now impinges on address 238, which is less than the nominal 256 address. Photodiode 63 will detect the 42 traversals of the opaque rulings that the reference beams make and detector 52 will also detect the fact that the output signal from photodiode 63 now lags the signal from photodiode 64. Accordingly, the count in counter 51, will be decremented by the 42 traversals counted by photodiode 64, and this process will continue until the damping system built into the galvanometer becomes fully effective, and the beam assumes a stable position. This stable position will then be forwarded from counter 51 to computer 71 and should agree with the theoretical address position 256. If it does, or if it is within some acceptable region thereof, for example, +2 address positions, the computer will generate the necessary commands to cause control circuit 75 (FIG. 7) to energize the YAG laser, for example, by closing optical switch 12, and thereby machine the workpiece. If it does not agree, or if the actual beam position falls outside acceptable tolerance limits for the particular workpiece being machined, the computer will direct the deflection circuit to make the necessary additional corrections.

The above discussion assumed that there were sufficient rulings on grids 34 and 38 to provide the resolution required by the system. For example, 10,000 rulings would be necessary for the hypothetical system discussed above. Grids having this many rulings are expensive and difficult to make, and according to the invention, grids having fewer rulings than the system resolution calls for may also be employed. In that event, to ascertain the accurate position of the beam with respect to the workpiece, the outputs of the photodiodes in both the x and y detectors are sliced n times using a conventional slicing circuit. As is well known, a periodic wave which is substantially a sinusoidal wave, such as the wave obtained from photodiodes 63 and 64, is essentially linear from 0° to 45°, but becomes relatively nonlinear from 45° to 90°. Thus, if the system disclosed herein employed only one reference beam, and a grid having less than the optimum number of rulings were used, the accuracy of the system would suffer, due to the aforesaid nonlinearity in the output from the photodiode which would affect the accuracy of the level slicing system. However, as discussed, the system disclosed herein actually employs two reference beams, each 90° spatially out-of-phase with one another. It thus becomes possible to use the wave generated by one beam over its most linear range, switching over to the wave generated by the other beam for its most linear range. Thus, as shown in FIG. 8, which illustrates a system wherein eight slicing levels are employed, only the first four slicing levels of the waveform generated by the first photodiode are used. Then, for the next eight slicing levels the system switches to the other waveform, then back to the first four slicing levels of the first waveform, etc. This results in each output wave being employed for beam position monitoring only over its most linear range, i.e., 0°–45°, and 135°–180°. Thus, high system resolution is maintained even though reference grids are employed which, per se, do not have as high a resolution as the system itself demands.

The invention has been disclosed with reference to its preferred embodiment in which laser beams are employed for both the machining beam and the reference beams. One skilled in the art will appreciate, however, that the invention is not so limited. For example, the invention would work equally as well if the machining beam were a focused beam of infrared radiation. The reference beams, also, need not be laser beams but could be any focused incandescent source. Indeed, in its broadest aspects, the invention is not limited to visible light beams but could be used to position other forms of radiant energy, such as ion beams, microwave beams, electron beams, etc. All that is necessary is to ensure that the mirrors, lens and beam splitters are constructed such that they perform the required function at the wavelengths of interest. In its broadest aspects, the invention resides in the use of one or more reference beams "piggybacked" upon a work beam and, as such, is not limited by the type of radiation employed.

One skilled in the art can make various changes and substitutions to the arrangement of parts shown without departing from the spirit and scope of the invention.

What is claimed is:

1. In apparatus of the type wherein an intermittently energizable first beam of radiant energy is deflected by deflection apparatus to impinge upon a selected location on a workpiece, the improvement which comprises:

means for predicting where said beam will impinge upon said workpiece, when said beam is next energized, said means comprising:

a source of a continuously energized second beam of radiant energy;

means, positioned in the optical paths of said first and said second beams, upstream of said deflection apparatus, for multiplexing said second beam onto the optical path of said first beam;

a beam splitter, positioned downstream of said deflection apparatus, for separating the optical paths of said first and second beams, the optical path of said first beam thereafter impinging upon said workpiece; and means, positioned in the optical path of said second beam, for determining the degree of deflection experienced by said second beam, relative to some arbitrary reference point, thereby predicting the degree of deflection that said first beam will undergo when next energized and thus determining, prior to the energization thereof, whether or not said first beam will impinge upon said selected location.

2. The apparatus according to claim 1, further including means, connected to said deflection determining means, for comparing the predicted deflection of said first beam with the desired deflection of said first beam; and means, responsive to said comparison, for supplying an offsetting feedback signal to said deflection apparatus to move the predicted point of impingement of said first beam towards said selected location.

3. The apparatus according to claim 1 wherein said radiant energy beam is a light beam and said deflection determining means comprises:

light-detecting means for generating an output signal which is proportional to the intensity of the illumination falling thereon;

at least one reference grid comprising a plurality of opaque lines on a transparent field, said grid being positioned between said second beam and said light-detecting means such that as said second beam is deflected across the grid the modulation superimposed on the second beam by the grid causes said light-detecting means to generate a periodic output wave; and means, connected to the output of said light-detecting means, for counting the number of cycles in said periodic wave, the accumulated count therein being indicative of the number of opaque-line traversals that the second beam undergoes, and hence determinative of the amount of deflection experienced by said second beam, with respect to said arbitrary reference point.

4. The apparatus according to claim 3 wherein said deflection determining means further includes means for sensing the direction in which said second beam traverses said reference grid.

5. The apparatus according to claim 4 wherein said predicting means further comprises:

means, positioned in the optical path of said second beam prior to its impingement upon said multiplexing means, for splitting said second beam into two sub-beams each spatially out-of-phase with the other by an angle $\theta$, where $\theta = (90° + 2\pi n)$, $n = 0,1,2,3...$, with respect to the line-to-line spacing on said grid; and said light-detecting means further comprises:

at least one pair of photosensitive devices each device respectively receiving light from only one of the two sub-beams and generating a periodic output wave in response thereto, said direction-sensing means further comprising:

means for sensing the phase difference between the outputs of the two photosensitive detectors to thereby determine the direction of deflection of said sub-beams.

6. The apparatus according to claim 5 wherein said counting means comprises a reversible counter connected to the output of said phase-sensing means, said counter counting upwards for one direction of sub-beam traversal over said grid, and downwards for the other direction of traversal.

7. The apparatus according to claim 1 wherein said radiant energy beam is a light beam and said predicting means further comprises:

means, positioned downstream of said beam-splitter, for dividing said second beam into first and second beam portions of substantially equal intensity, said deflection determining means further comprising:

first and second light-detecting means each generating an output signal proportional to the intensity of the illumination falling thereon;

first and second orthogonally-oriented reference grids each comprising a plurality of opaque lines on a transparent field, said grids being respectively positioned between said first and second beam portions and said first and second light-detecting means such that as each beam portion is deflected across the corresponding reference grid, the modulation superimposed upon each second beam portion by its reference grid causes the corresponding light-detecting means to generate a periodic output wave; and means, connected to the output of said first and second light-detecting means, for counting the number of cycles in each periodic wave, the two accumulated counts being indicative of the number of opaque-line traversals that each beam portion undergoes and, hence, determinative of the amount of deflection experienced by said second beam, with respect to said arbitrary reference point, along two orthogonal axes.

8. The apparatus according to claim 7 further including means, connected to said deflection-determining means, for comparing the predicted deflection of said first beam along said two orthogonal axes with the desired deflection of said first beam along said two orthogonal axes; and means, responsive to said comparison, for supplying first and second offsetting feedback signals to said deflection apparatus to move the predicted point of impingement of said first beam towards said selected location along said two orthogonal axes.

9. The apparatus according to claim 7 wherein said deflection determining means further includes means for sensing the direction in which each of the two second beam portions traverses its respective reference grid.

10. The apparatus according to claim 9 wherein said predicting means further comprises:

means, positioned in the optical path of said second beam prior to its impingement upon said multiplexing means, for splitting said beam into two sub-beams each spatially out-of-phase with the other by an angle $\theta$, where $\theta = (90° + 2\pi n)$ $n = 0,1,2,3...$, with respect to the line-to-line spacing on said first and second grids, said splitting means further displacing one of said sub-beams downwardly with respect to the other sub-beam along a line which makes a 45° angle with both of said orthogonal axes; and said first and second light-detecting means each comprise:

first and second photo-sensitive devices, said first device receiving light only from the undisplaced sub-beam and generating a first periodic output wave in response thereto, and said second device receiving light only from the displaced sub-beam and generating a second periodic wave in response thereto, and said direction-sensing means further comprises:

first and second means for sensing the phase difference between the respective first and second periodic output waves generated by said photosensitive detectors to thereby determine the direction of deflection of said sub-beams along said orthogonal axes.

11. The apparatus according to claim 10 wherein said counting means comprises first and second reversible counters respectively connected to the outputs of said first and second phase-sensing means, each counter counting upwards for one direction of sub-beam traversal over its associated reference grid and downwards for the other direction of travel.

12. The apparatus according to claim 10 wherein said predicting means further comprises a telecentric lens, intermediate said deflection apparatus and said beam splitter, for focusing said first beam onto said workpiece, said first beam impinging upon said workpiece substantially normal to the plane of the workpiece and without regard to the degree of deflection imposed thereon by said deflection apparatus, said splitting means further including means for causing said sub-beams to exit therefrom along slightly divergent paths.

13. A method of deflecting a first beam of radiant energy which comprises the steps of:

positioning deflection apparatus to deflect the optical path of an intermittently energizable first beam of radiant energy so that said beam will impinge upon a selected region of a workpiece;

superimposing a second, continuously energizable beam of radiant energy upon said optical path so that said second beam experiences the same deflection in said deflection apparatus that said first beam will experience when next energized;

diverting said second beam from said optical path, subsequent to its deflection in said deflection apparatus; and then, measuring the degree of deflection effected upon said second beam, relative to some arbitrary reference point, thereby predicting the degree of deflection to be effected upon said first beam and determining, prior to the energization thereof, whether or not said first beam will impinge upon said selected region.

14. The method according to claim 13 wherein said measuring step comprises:

modulating the intensity of said second beam by passing the beam through at least one reference grid comprising a plurality of opaque lines on a transparent field;

generating a periodic electrical signal proportional to the modulation on said second beam, as said second beam sweeps across said reference grid; and counting the number of cycles in said electrical signal thereby to determine the number of opaque-line traversals experienced by said second beam and hence the degree of deflection effected on said second beam, relative to said arbitrary reference point.

15. The method according to claim 14 including the further step of:

determining from said periodic electrical signal the direction of said deflection relative to said arbitrary reference point.

16. The method according to claim 14 comprising the further step of:

subsequent to said directing step, splitting said second beam into first and second beam portions of substantially equal magnitude, said modulating step further comprising:

modulating the intensity of each of said first and second beam portions by passing the beam portions through respective first and second orthogonally oriented reference grids.

17. The method according to claim 16 wherein said generating step comprises:

generating first and second periodic electrical signals respectively proportional to the modulation on said first and second beam portions, as said beam portions sweep across said first and second reference grids.

18. The method according to claim 16 wherein said superimposing step further comprises:

dividing said second beam into first and second sub-beams each out-of-phase with the other by $\theta°$, where $\theta° = (90° + 2\pi n)$, $n = 1,2,3...$ with respect to the opaque lines on said grid; and superimposing said first and second sub-beams upon said optical path so that said sub-beams experience the same deflection in said deflection apparatus that said first beam will experience when next energized.

19. The method according to claim 14 including the further step of:

supplying an offsetting feedback signal to said deflection apparatus in response to said measuring step to maintain said first beam impinging on said selected region on the workpiece.

* * * * *

L-566-PT
(6-69)

UNITED STATES PATENT OFFICE
CERTIFICATE OF CORRECTION

Patent No. _____3,902,036_____ Dated _____August 26, 1975_____

Inventor(s) _____V. J. ZALECKAS_____

It is certified that error appears in the above-identified patent and that said Letters Patent are hereby corrected as shown below:

In the specification, column 1, line 19, "substances" should read --substrates--. Column 3, line 37, "lower-power" should read --low-power--; line 52, "apparatus 25" should read --apparatus 26--. Column 4, line 31, "the" should read --that--. Column 8, line 11, "+2" should read -- $\pm 2$ --.

Signed and Sealed this twenty-eight Day of October 1975

[SEAL]

Attest:

RUTH C. MASON
Attesting Officer

C. MARSHALL DANN
Commissioner of Patents and Trademarks